United States Patent [19]

Lippert

[11] Patent Number: 4,668,062
[45] Date of Patent: May 26, 1987

[54] APPARATUS FOR PRECLUDING ROTATIONAL MOVEMENT OF AN ADVANCING FILM UNIT

[75] Inventor: Irving S. Lippert, Lexington, Mass.

[73] Assignee: Polaroid Corporation, Cambridge, Mass.

[21] Appl. No.: 897,284

[22] Filed: Aug. 15, 1986

Related U.S. Application Data

[63] Continuation of Ser. No. 708,161, Mar. 4, 1985.

[51] Int. Cl.⁴ .................. G03B 17/26; G03B 17/52
[52] U.S. Cl. ................................. 354/86; 354/276; 354/304
[58] Field of Search ................. 354/83–86, 354/276, 301, 303, 304; 430/499

[56] References Cited

U.S. PATENT DOCUMENTS 3,647,441  3/1972  Bachelder .................. 96/29
3,753,392  8/1973  Land ......................... 95/13
3,829,871  8/1974  Gold ......................... 354/86
3,854,809  12/1974 Driscoll ..................... 354/86
3,864,703  2/1975  Gold ......................... 354/86

Primary Examiner—W. B. Perkey
Attorney, Agent, or Firm—John J. Kelleher

[57] ABSTRACT

Photographic apparatus for use with a film unit of the self-developing type including a chamber for locating a film unit situated within a film cassette in position for exposure and a pair of rollers mounted adjacent a leading edge of a film unit located in the exposure position. The rollers are positioned to define a longitudinally extending gap which is substantially parallel with the leading edge of the film unit located in the exposure position. Film cassette structure is provided for maintaining the leading edge of the film unit substantially parallel to the longitudinally extending roller pair formed gap as the film unit is advanced toward and enters the roller-formed gap.

9 Claims, 3 Drawing Figures

APPARATUS FOR PRECLUDING ROTATIONAL MOVEMENT OF AN ADVANCING FILM UNIT

This is a continuation of application Ser. No. 708,161, filed Mar. 4, 1985, now pending.

BACKGROUND OF THE INVENTION

The present invention relates to self-developing photographic apparatus, in general, and to such apparatus utilizing photographic film units having a rupturable developer-fluid-containing pod attached to one end thereof, in particular.

Photographic apparatus of the self-developing type are well-known in the art and generally include film advancing means for engaging and moving an exposed film unit out of its exposure position within a light-tight film cassette and into engagement with a pair of pressure-applying, fluid spreading members such as a pair of longitudinally extending parallel rollers spaced a predetermined distance from one another. The film unit includes a pod, or container, of processing composition (developer liquid) having a sealed, rearwardly facing discharge end which is parallel to a leading edge of the film unit. The rollers are positioned to engage the leading end of the pod on the advancing film unit and subsequently generate sufficient pressure within the processing composition to rupture the seal and spread the contents thereof across a photosensitive layer of the film unit to initiate the formation of a visible image within the film unit while simultaneously advancing the film unit out of the photographic apparatus.

A plurality of film units are stacked within a box in the form of a light-tight cassette that includes a molded housing such that each of said film units may be sequentially moved into the exposure position and then out of the photographic apparatus after being moved into a gap between said composition spreading, pressure applying rollers by said film advancing means. The film unit is located in the exposure position within the cassette with its leading edge parallel with the axes of the rollers and the film-advancing structure must be constructed such that minimum changes in this parallelism occur while the film unit is being advanced into the bite of the rollers in order to insure uniform distribution of spreading processing composition.

In molding some types of light-tight film cassette housings, it is essential that a draft angle be incorporated within the cassette in order to facilitate mold-member removal after the molding process is complete. This draft angle causes the cross-section of the cassette housing at the end where the film unit exits to be slightly larger than the cassette housing cross-section end remote from said exit end. Normal exposed-film unit advancing practice in self-developing cameras consists of advancing the film unit out of the exposure station and into the bite of the composition-spreading rollers by applying an asymmetrical force at that edge of the film unit remote from the cassette opening, in the direction of preferred film unit movement. However, the application of such a film unit-moving asymmetrical force causes the film unit to rotate about an axis normal to the direction of preferred film unit movement and to thereby destroy the above-mentioned desirable parallelism between the leading edge of the film unit and the axes of the rollers and thereby interfere with the ability of the spread system to uniformly spread the processing composition of a self-developing film unit. In addition, in processing composition spread systems of the type that include a pair of spaced-apart annular flow-controlling recesses or grooves in one of a pair of adjacent composition spreading rollers for the purpose of precluding the "red-framing" effect in accordance with the teachings of U.S. Pat. No. 3,647,441 to BACHELDER, it is essential that these annular grooves continuously span the side edges of the visible image to be formed in an advancing film unit in order to insure that "red-framing" does not occur. Any significant rotation of the film unit relative to the spread system prior to processing composition spreading would reduce the effectiveness of these composition-flow-controlling grooves.

Several arrangements have been employed in the past to avoid this incomplete processing composition spreading problem. In one arrangement, described in U.S. Pat. No. 3,854,809 to DRISCOLL, a tapered gap is established between a pair of processing composition spreading rollers to compensate for the incomplete spreading that would otherwise be caused by film unit canting when the film unit is moved into the bite of a pair of rollers by an asymmetrical force-providing actuator. In another arrangement described in U.S. Pat. No. 3,829,871 to GOLD, pressure-applying rollers are mounted with the bite or longitudinally extending gap being positioned at an acute angle with respect to the leading edge of the film unit located within the camera in position for exposure. This aforementioned acute angle is equal to the same number of degrees that the film unit is subsequently canted during its movement out of its exposure position and into the bite of the processing composition spreading rollers. In yet another arrangement described in U.S. Pat. No. 3,864,703 to GOLD, camming structure is provided for returning the film unit to a position where its leading edge is once again parallel to the bite of a roller pair gap after being moved from its exposure position by an asymmetrical force.

It is a primary object of the present invention, therefore, to provide photographic apparatus for processing a film unit of the self-developing type such that a leading edge of the film unit is aligned in parallel with a longitudinally extending gap defined by a pair of pressure-applying members and maintained in said alignment during film unit processing movement.

Another object of the present invention is to provide a light-tight film cassette and a plurality of stacked film units therein wherein rotational movement of said film units within the cassette about an axis normal to the direction of preferred film unit movement is precluded when an assymetrical force is applied to an edge of said film unit during film unit processing movement.

A further object of the present invention is to provide a light-tight film cassette with non-parallel side walls for precluding rotational movement of film units within said cassette about an axis parallel to the direction of preferred film unit movement when an asymmetrical force is applied to an edge of said film units during film unit processing movement.

Other objects and advantages of my invention will be made readily apparent by referring to the preferred embodiments thereof described in detail below.

SUMMARY OF THE INVENTION

In accordance with the present invention, photographic apparatus for use with a film unit of the self-developing type is provided with means for precluding film-processing-degrading rotational movement of said film unit caused by the application of an asymmetrical force to an edge thereof when moving said film unit out of a film cassette and into a longitudinally extending gap defined by a pair of processing composition spreading, pressure applying members. A plurality of film units are stacked within said cassette such that they can be sequentially moved into and out of an exposure station defined by a cassette opening. Optimal spreading of processing composition on the photosensitive layer of each of said film units is achieved by supporting a particular edge of each film unit with a film cassette side wall such that rotational movement of a film unit is precluded and the positional relationship between the leading edge of the film unit and said longitudinally extending gap is maintained as said film unit is moved out of the cassette and into engagement with said pair of pressure-applying members by the application of said asymmetrical force.

DESCRIPTION OF THE PREFERRED EMBODIMENTS

Figure 1:
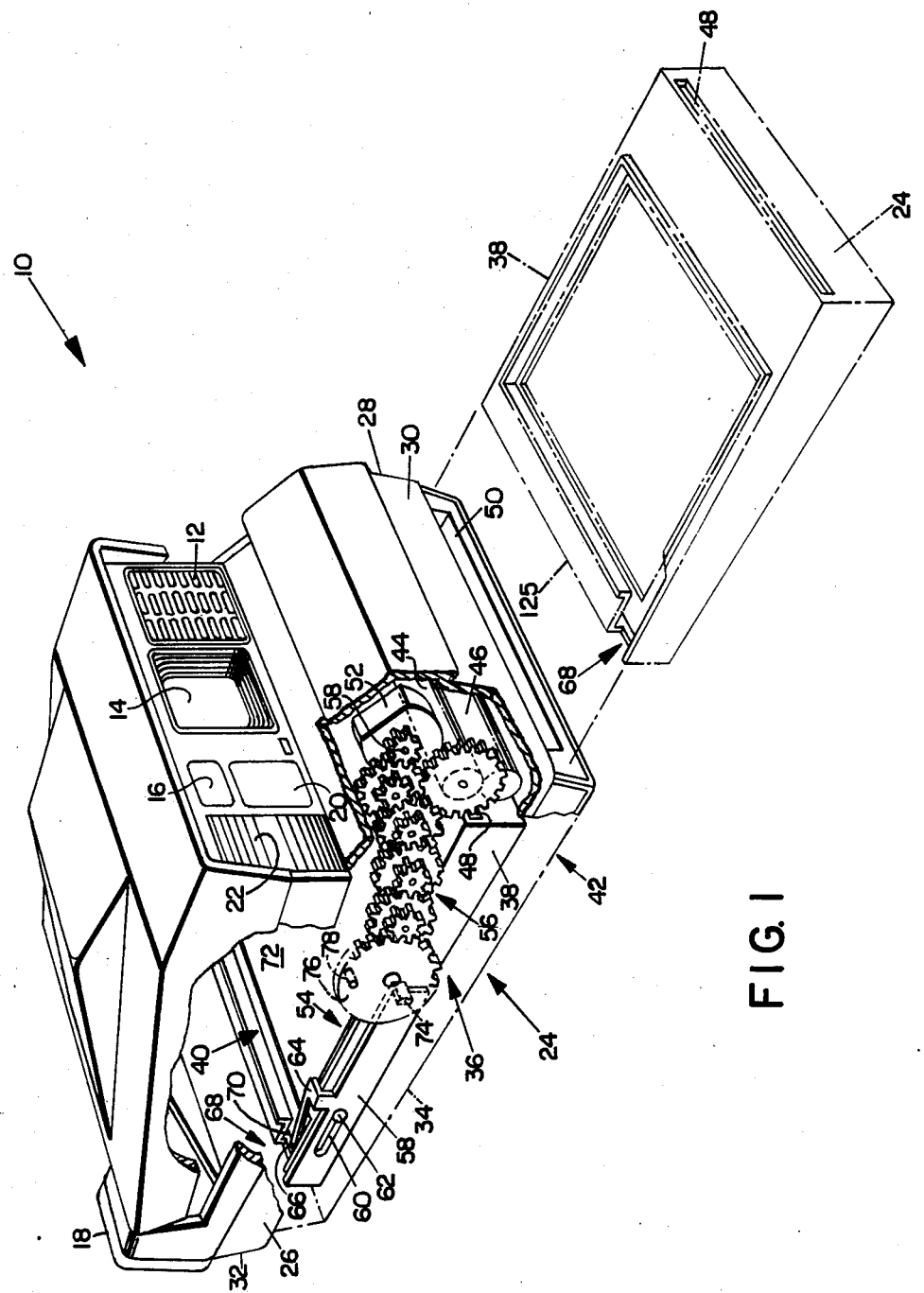
FIG. 1 is a perspective view, partly in section, of photographic apparatus embodying the instant invention.

Reference is now made to FIG. 1 of the drawings wherein is shown photographic apparatus in the form of camera 10 of the self-developing type. Camera 10 includes ultrasonic transducer 12 that forms a part of a rangefinder system employed to determine the distance to a subject to be photographed for subsequent lens focusing purposes, a lens and shutter assembly 14, a photocell 16, an eyecup 18 and a viewfinder window 20 through which scenes to be photographed may be framed and a light-providing strobe 22.

Camera 10 also includes housing portion 24 defined by a pair of side walls 26 and 28, a leading end wall 30, a trailing end wall 32 and a bottom wall 34. A major portion of the side walls 26 and 28 and the bottom wall 34 together with the trailing end wall 32 define an open-ended film chamber 36 for receiving a generally parallelepiped configured plastic molded film cassette 38 so as to locate a film unit of the instant type contained therein in a particular plane for exposure through exposure opening 40 in the film cassette 38. Film unit containing cassette 38 has been shown twice in FIG. 1, both before being inserted into film cassette chamber 36 (in phantom) and after being fully inserted into said chamber 36.

Spread roller housing 42, which is a continuation of the housing 24, extends across the open end of the film chamber 36. Mounted within housing 42 is a pair of juxtaposed rollers 44 and 46 having their longitudinal axes parallel to one another, and a coiled sheet (not shown) formed from an opaque resilient material having a width slightly greater than that of a film unit and a length greater than that of the film unit. As is well-known in the art, the film unit is adapted to be moved out of the film cassette 38, subsequent to exposure, via egress slot 48 in a leading end wall thereof and into the bite of the rollers 44 and 46, at least one of which is being driven when such movement occurs. The rollers 44 and 46 continue the advancement of the exposed film unit from the film cassette 38 while simultaneously rupturing a container of processing liquid attached to the leading end of the film unit and spreading its contents between elements of the film unit so as to initiate the formation of a visible image therein. As the leading edge of the film unit emerges from between rollers 44 and 46, its leading edge engages the above-mentioned coiled opaque sheet simultaneously causing said leading film unit edge to uncoil said sheet such that it progressively covers the light sensitive face of the film unit to prevent further exposure thereof as the film unit exits from a camera via slot 50 in the leading end wall of camera 10.

Camera 10 further includes a motor 52 which preferably is powered by a battery located within cassette 38 and film advancing means 54 and gearing 56 operatively coupled to motor 52 and to roller 44 via gear 58 attached thereto. Gearing 56 is also adapted to drive film advancing means 54. Specifically, film advancing means 54 includes a generally planar member 58 having elongated slot 60 therein whereby it is attached to suitable camera structure (not shown) by pin 62 for reciprocal motion; a cantilevered arm 64 having a film engaging end 66 which is adapted to extend into opening 68 in cassette 38 to engage the trailing end 70 of the film unit 72 located in position for exposure prior to moving it out of cassette 38 via cassette opening 48; and a flange 74. Gearing 56 includes a gear 76 having an inwardly extending pin 78 located on one of its faces. During the operation of camera 10, gear 76 is rotated in a counter-clockwise manner as viewed in FIG. 1 to move pin 68 into engagement with flange 74 to move the film advancing means 54 to the right, thereby moving film unit 72 out of its exposure position and into engagement with composition spreading rollers 44 and 46.

In operation, after a particular scene has been framed by the camera operator as viewed through eyecup 18 and viewfinder window 20, an exposure sequence initiating switch (not shown) is manually actuated to its closed position, thereby causing the rangefinder to determine subject distance and then subsequently cause the lens to be focused in accordance with this rangefinder determined subject distance. After lens focusing, a particular latent image is formed on film unit 72. Subsequent to the forming of said image on film unit 72, motor 52 is energized to drive rollers 44 and 46 through gearing 56 including gear 58 and to drive the film advancing means as described above. Actuation of the film advancing means 54 moves film engagement end 66 of arm 64 into contact with the trailing end 70 of the film unit 72 thereby moving said film unit 72 out of its exposure position and into the bite of rotating rollers 44 and 46 via opening 48 in cassette 38.

Figure 2:
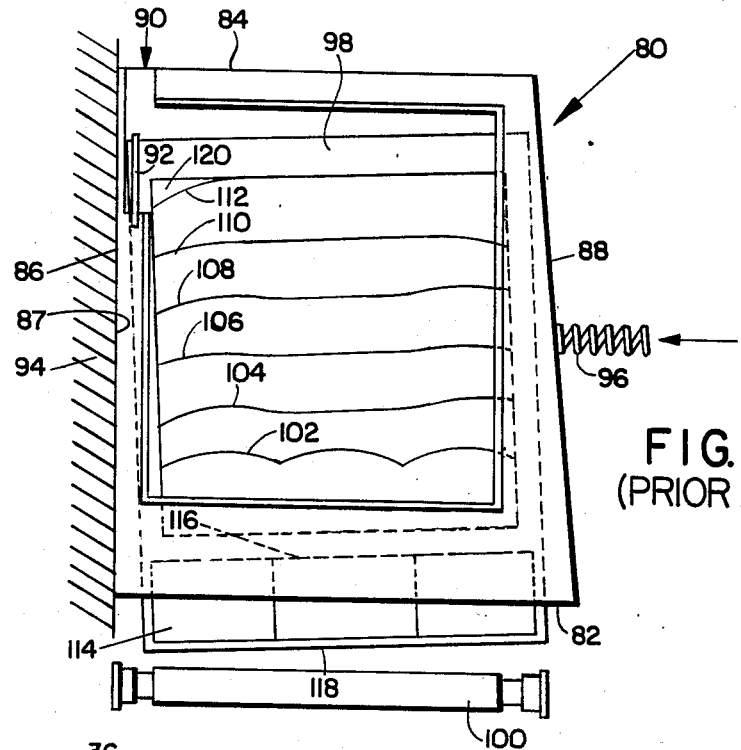
FIG. 2 is a diagrammatic plan view of a film unit exiting from a film cassette and moving into engagement with pressure-applying rollers in accordance with the prior art.

As explained above, in the molding of a film cassette housing, it is essential that a draft angle be incorporated within the cassette in order to facilitate mold-member removal after the molding process is complete. A diagrammatic plan view of a presently available molded film cassette incorporating such a draft angle is shown in prior art drawing FIG. 2. In FIG. 2, conventional molded cassette 80 includes leading end wall 82, trailing end wall 84, longitudinal side walls 86 and 88 extending between said end walls 82 and 84 and opening 90 adapted to receive cantilevered film-unit-moving arm 92. Longitudinal side wall 86 engages wall 87 of the cassette receiving film chamber within camera 94 and is maintained in this position by spring means 96 firmly pressing against opposite generally longitudinal side wall 88. The draft angle in cassette 80 is formed by longitudinal side wall 88, a wall that is remote from opening 90 in trailing end wall 84. The draft angle was formed in side wall 88 and not in side wall 86 in order to optimally control the relationship between the camera and the engagement of film unit moving arm 92 with the trailing edge of an exposed film unit. The draft angle in such circumstances is normally less than one-half a degree. However, for the purpose of facilitating this description, the draft angle of side wall 88 in FIG. 2 has been greatly exaggerated. Film unit 98 is located within cassette 80 and is being moved toward processing composition spreading roller pair 100 (one shown) by actuator or cantilevered film-moving-arm 92. It should be noted that the end of film engaging arm 92 applies an asymmetrical force to film unit 98 in that it engages the film unit at a point that is substantially removed from the longitudinal center of said film unit 98. Engaging and moving a film unit in this manner normally results in the film unit being canted as it is moved out of cassette 80 and into the bite of roller pair 100. Canting of the film unit is possible because of the necessary draft angle formed by longitudinal side wall 88 as previously explained. Should this scanting or skewing of film unit 98 take place within cassette 80 before being moved out of its exposure position, a spread pattern similar to that diagrammatically illustrated in FIG. 2 by lines 102, 104, 106, 108, 110 and 112 may be produced. These lines represent progressive stages of the advancing edge of the processing composition during composition spreading. For example, when processing composition containing pod 144 is comprised of three compartments as shown in FIG. 2, initial rupturing of the pod 114 by roller pair 100 produces an advancing wavefront as shown at 102. As the film unit continues its movement through roller pair 100, the major portion of the wavefront progressively flattens out while the left side of the wave, as viewed in FIG. 2, trails behind, as shown from 104 to 112. However, the processing composition is not only spread from the leading end of the film unit to its trailing end, but also from the left side of the film unit to the right side, i.e., there is a lateral movement of the processing composition toward the right side of the film unit. This lateral movement of the processing composition may be caused by a lateral force component created as a result of the acute angle between a line containing the discharge end 116 of the pod 114, which is perpendicular to the longitudinal axis of film unit 98, and a plane containing the longitudinal axes of the roller pair 100. Since the rollers are adapted to define a longitudinally extending gap when a film unit is located therebetween and since the discharge end 116 is parallel with the leading end 118 of film unit 98, it is also true that the last-mentioned acute angle is also defined by the longitudinally extending roller gap and the leading end of the film unit 98. The lateral movement of the processing composition to the right may result in the left side of the wave receding relative to the remainder of the wavefront until you reach a condition as shown at 112 where substantially the entire photosensitive area of the film unit has been covered by the processing composition except for the area 120. In other words, it appears that the amount of processing composition originally provided in pod 114 for covering the left side of the film unit is gradually reduced by the left-to-right lateral movement of the processing composition, thereby resulting in the processing composition on the left side of the film unit being depleted before the corner area 120 of the photosensitive layer of the film unit has been covered by the processing composition. Obviously, this type of spread will not produce a visible image in the area 120.

Figure 3:
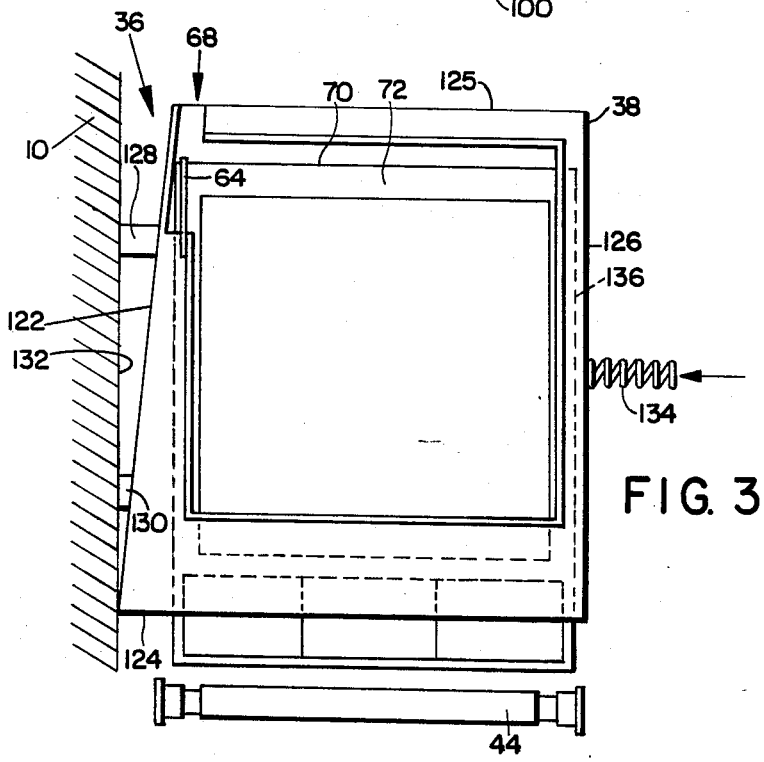
FIG. 3 is a diagrammatic plan view of a film unit exiting from a cassette and moving into engagement with pressure-applying rollers in accordance with the present invention.

The present invention overcomes the processing composition spreading problem by forming the draft angle with longitudinal side wall 122 of plastic molded film cassette 38 or the side wall immediately adjacent cantilevered arm opening 68 in trailing end wall 125 of said cassette 38 as shown in drawing FIGS. 1 and 3. With reference to both FIGS. 1 and 3, cassette 38 is adapted to fit within film chamber 36 in camera 10 as shown in drawing FIG. 1. A diagrammatic plan view of said cassette 38 is shown in drawing FIG. 3. In FIG. 3, cassette 38, incorporating a preferred embodiment of the present invention, includes leading end wall 124, trailing end wall 125, longitudinal side walls 122 and 126 extending between said leading end wall 124 and said trailing end wall 125 and opening 68 adapted to receive cantilevered film-unit-moving arm 64. Longitudinal side wall 126 is remote from trailing end wall opening 68 and is at right angles to both leading end wall 124 and trailing end wall 125. The draft angle in cassette 38 is formed by generally longitudinal side wall 122, a wall that is proximate to or immediately adjacent opening 68 in trailing end wall 125. The draft angle as explained above is normally less than one-half a degree and like the draft angle of cassette 80 in FIG. 2, it has been greatly exaggerated to facilitate this description. The draft angle is, as explained above, to facilitate mold removal after the molding process is complete and therefore, because of this necessary draft angle, the spacing between longitudinal side walls 122 and 126 is greater at leading end wall 124 than at trailing end wall 125.

Generally, longitudinal side wall 122 includes a pair of outwardly extending projections 128 and 130. The projections 128 and 130 engage wall 132 of cassette film chamber 36 and are maintained in this position by spring means 134 firmly pressing against opposite longitudinal side wall 126. The function of projections 128 and 130 is to position side wall 126 of cassette 38 normal to a plane containing the longitudinal axes of processing composition spreading roller pair 44 and 46 and therefore parallel to the direction of preferred film-unit-moving movement of arm 64 through trailing end wall opening 68. These projections continue the same optimal relationship between the camera and the engagement of the film unit moving arm (64) with the trailing edge of an exposed film unit (72). These projections could obviously be located on wall 132 of film chamber 36 in the positions shown in FIG. 3, but are preferably located on longitudinal side wall 122 of cassette 38 as indicated.

Film unit 72 is located within cassette 38 and is being moved toward the gap formed between processing composition spreading roller pair 44 and 46 by actuator or cantilevered film-unit-moving arm 64. As explained above with respect to the prior art arrangement in drawing FIG. 2, arm 64 applies an asymmetrical force to film unit 72 in that it engages trailing edge 70 at a point that is substantially removed from the longitudinal centerline of film unit 72, the centerline that extends in the direction of preferred film unit movement. When this asymmetrical force is applied near the end of film unit edge 72, rotational motion of film unit 72 is precluded because edge 136 of film unit 72 remote from the point where said force is applied is supported by longitudinal side wall 126. With projections 128 and 130 and spring means 134 maintaining the orientation of cassette side wall 126 normal to a plane containing the longitudinal axes of rollers 44 and 46 as previously explained, the parallelism between leading edge 124 of film unit 72 and the bite of rollers 44 and 46 is maintained as said film unit 72 is moved into the bite of said rollers by actuator or cantilevered film unit moving arm 64, thereby avoiding incomplete processing composition spreading of the type that occurs in the prior art apparatus described above with respect to drawing FIG. 2.

It will be apparent to those skilled in the art from the foregoing description of my invention that various improvements and modifications can be made in it without departing from its true scope. The embodiments described herein are merely illustrative and should not be viewed as the only embodiments that might encompass my invention.

What is claimed is:

1. A plastic molded film cassette, adapted to retain at least one self-developing type film unit having leading, trailing and longitudinal edges, for positioning within a cassette receiving chamber of a self-developing camera that includes a pair of juxtaposed elongated rollers, forming a bite therebetween, adapted to effect spreading of a processing fluid across the film unit as it is progressively advanced between the rollers and a camera actuator adapted to selectively exert a force on the film unit at a location thereon adjacent both its trailing edge and one longitudinal edge thereof and in a direction substantially normal to a rotational axis of the rollers to effect advancement of the leading edge of the film unit from the cassette and into the bite of the rollers, said film cassette comprising:

a forward wall having an egress for the movement of a film unit outwardly of said cassette, said egress being operably disposed with respect to the bite of the camera rollers when said cassette is mounted in the camera;

a pair of side walls respectively extending from opposite ends of said forward wall in a direction away from the camera rollers when said cassette is mounted in the camera, at least the one of said side walls positioned adjacent the camera's actuator when the cassette is mounted in the camera being canted at a small angle from a normal with respect to said forward wall to accommodate a molding operation employed in forming said cassette; and means formed on said film cassette for engaging cooperating structure of the camera to automatically position the other of its said side walls normal with respect to the camera rollers and parallel to the direction of the force exerted on the film unit by the camera's actuator when said cassette is mounted in the camera, said means including at least one projection extending from said cassette outwardly of its said one side wall.

2. The plastic molded cassette of claim 1, wherein said means formed on said film cassette for positioning a cassette side wall includes a pair of spaced-apart projections extending outwardly of said cassette side wall.

3. The plastic molded cassette of claim 1, wherein the said small angle between one of said side walls and said forward wall is less than one-half a degree.

4. A camera adapted to receive a plastic molded film cassette containing at least one self-developing type film unit having leading, trailing and longitudinal edges, the cassette including a substantially straight elongated forward wall having an egress for movement of the film unit outwardly of the cassette, a pair of side walls extending from opposite ends of the forward wall in the same general direction away from the forward wall, at least one of said side walls being canted at a small angle from a normal with respect to the forward wall to accommodate a molding operation employed in forming the cassette and means for receiving an actuator into operative relationship with respect to a location on the film unit adjacent both the trailing edge of the film unit and the longitudinal edge of the film unit disposed adjacent the afore-mentioned one of its side walls, said camera including:

a pair of juxtaposed elongated rollers, forming a bite therebetween, adapted to effect spreading of a processing fluid across the film unit as it is progressively advanced therebetween;

means for receiving the cassette with its egress positioned in operative relationship to the bite of said rollers; and an actuator adapted to selectively exert a force on the film unit at the aforementioned location thereon and in a direction substantially normal to a rotational axis of said rollers when the cassette is positioned in said cassette receiving means to effect the advancement of the leading edge of the film unit from the cassette through the egress in the forward wall thereof and into the bite of said rollers, said cassette receiving means being structured to automatically engage the side walls of the cassette when the cassette is mounted therein to position the other of the cassette's side walls normal with respect to a rotational axis of said rollers and parallel to the direction of the force exerted on the film unit by said actuator.

5. The camera of claim 4, wherein said cassette-receiving means structured to automatically engage the side walls of the cassette includes a surface adjacent one of said cassette side walls and said surface includes at least one projection for engagement with an outer surface of a cassette side wall.

6. A film cassette housing for enclosing a plurality of stacked self-developing type film units, comprising:

a pair of elongated end walls at opposite ends of said housing, one of said end walls having an egress for movement of an exposed film unit therethrough, the opposite end wall having an opening for movement of a force-applying member therethrough; and a pair of opposed elongated side walls extending between said end walls with one of said side walls intersecting said opposite end wall remote from said force-applying member opening and in a direction normal to said opposite end wall, with the other of said side walls intersecting said opposite end wall proximate to said force-applying member opening and with space between said side walls at the egress end wall being greater than space between said side walls at said opposite end wall.

7. A light-tight film cassette for improving spreading characteristics of processing composition on a photosensitive layer of a plurality of exposed self-developing type film units as they are sequentially moved out of said cassette and between a pair of composition spreading, pressure-applying members, comprising:

a film cassette housing including a pair of elongated end walls at opposite ends of said housing, one of said end walls having an egress for movement of exposed film units therethrough, the opposite end wall having an opening for movement of a force-applying member therethrough, a pair of opposed elongated side walls extending between said end walls with one of said side walls intersecting said opposite end wall remote from said force-applying member opening in a direction normal to said opposite end wall, with the other of said side walls intersecting said opposite end wall proximate to said force-applying member opening and with space between said side walls at the egress end wall being greater than space between said side walls at said opposite end wall; and a plurality of stacked film units located within said film cassette, each said film unit comprising a container of processing composition adjacent a leading edge thereof, with an edge of each film unit being supported by said remote side wall, and with the leading edge of one of said film units being urged into a position adjacent said housing end wall egress, whereby rotational movement of each of said film units is precluded by said film unit supporting side wall whenever a translational movement producing force is applied to a film unit positioned adjacent said end wall egress, through said end wall force-applying member opening for the purpose of moving an exposed film unit out of said cassette through said end wall egress and between said pair of processing composition spreading, pressure-applying members.

8. A self-developing type photographic camera in combination with a light-tight film cassette for improving spreading characteristics of processing composition on a photosensitive layer of a plurality of exposed film units as they are sequentially moved out of said cassette and between a pair of composition spreading, pressure-applying members, comprising:

pressure applying means adapted to engage opposite sides of an exposed film unit for spreading a processing composition across a photosensitive layer of the exposed film unit when the film unit is being advanced therebetween;

a film cassette housing including, a pair of elongated end walls at opposite ends of said housing, one of said end walls having an egress for movement of exposed film units therethrough, the opposite end wall having an opening for movement of a force-applying member therethrough, a pair of opposed elongated side walls extending between said end walls with one of said side walls intersecting said opposite end wall remote from said force-applying member opening in a direction normal to said opposite endwall with the other of said side walls intersecting said opposite end wall proximate to said force-applying member opening and with space between said side walls at the egress end wall being greater than space between said side walls at said opposite end wall;

a plurality of stacked film units located within said film cassette, each said film unit comprising a container of processing composition adjacent a leading edge thereof, with an edge of each film unit being supported by said remote side wall, and with a leading edge of one of said film units being urged into a position adjacent said housing end wall egress; and a film advancing member adapted to extend through said end wall force-applying member opening during selected time intervals and engage an edge of said adjacent film unit for moving an exposed film unit out of said cassette through said end wall egress and into engagement with said pair of processing composition spreading, pressure-applying members, whereby rotational movement of each of said film units with respect to said pressure-applying means is precluded by said film unit supporting side wall whenever said film advancing member moves through said end wall force-applying member opening and translates an exposed film unit out through said end wall egress and into engagement with said pressure applying means.

9. The camera of claim 8, wherein said pressure-applying means includes a pair of parallel rollers positioned to define a longitudinally extending gap that is substantially parallel to the leading edge of an exposed film unit.

* * * * *